Oct. 13, 1936.     G. A. CASTELLAZZI     2,057,416
STEAM HEATING PLANT
Filed May 22, 1935     3 Sheets-Sheet 2
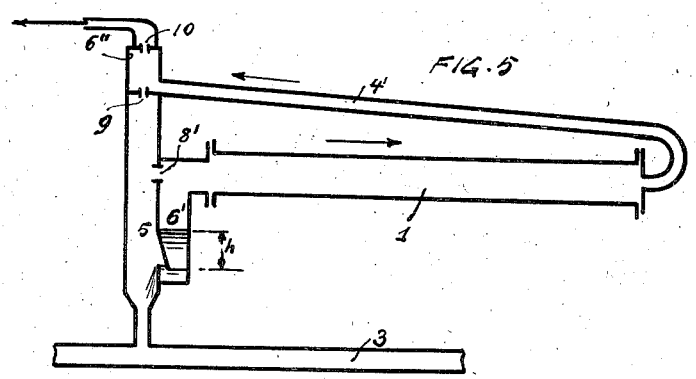
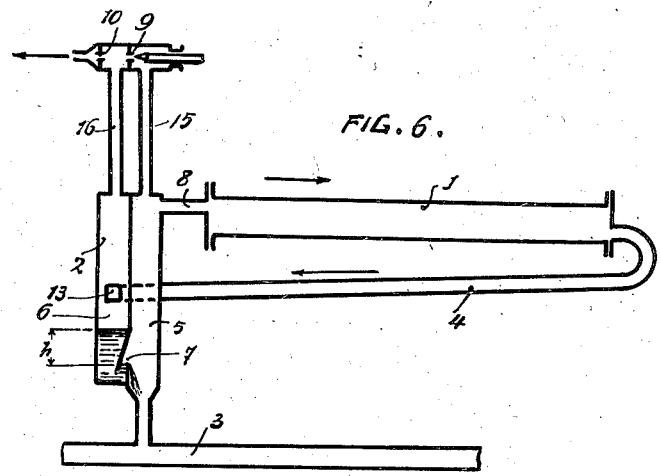
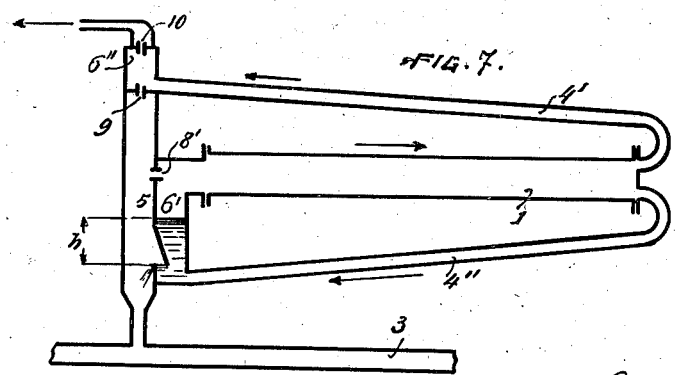

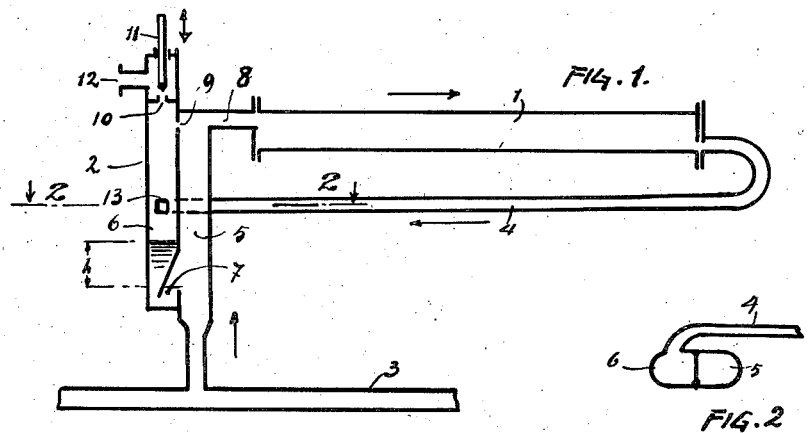
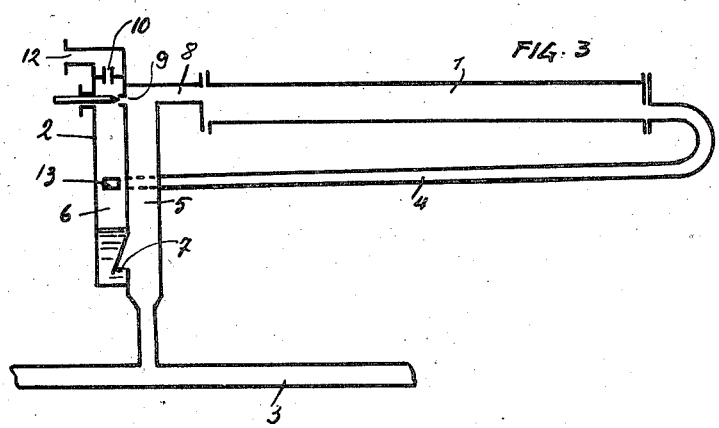
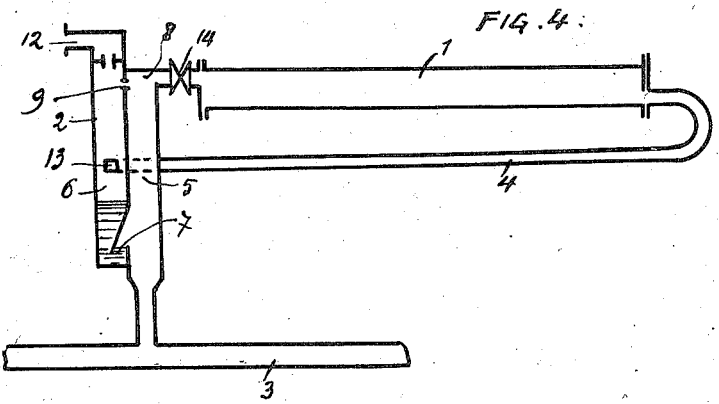

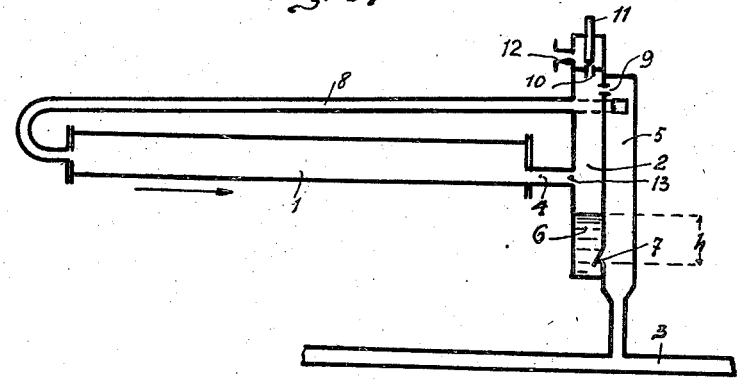
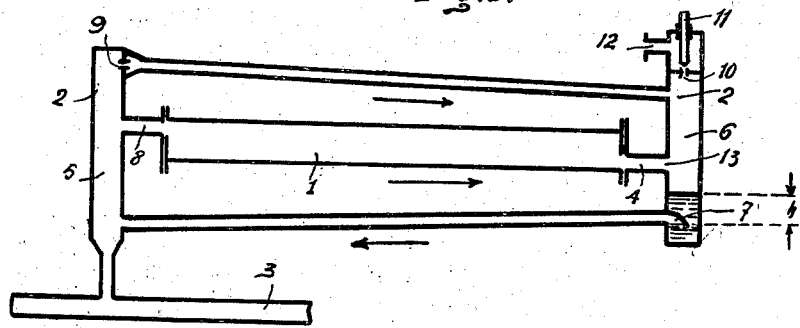

Patented Oct. 13, 1936

2,057,416

UNITED STATES PATENT OFFICE 2,057,416

STEAM HEATING PLANT

Giacomo Arturo Castellazzi, Milan, Italy

Application May 22, 1935, Serial No. 22,861
In Italy June 22, 1934

3 Claims. (Cl. 257—248)

The present invention has for its subject matter a steam heating plant which, by means of suitable provisions that will be described below, permits of varying the heating effect at will.

Fig. 1 is a diagrammatic representation of a vertical section through the device.

Fig. 2 is a diagrammatic representation of a horizontal section on the line 2—2 of Fig. 1.

Figs. 3-9 are diagrammatic representations of vertical sections similar to Fig. 1, of modified forms of the device.

A heating body 1, of any desired form which may be fitted with ribs, is immersed in a solid, liquid or gaseous surrounding mass to be heated. Through the supply-and-drain member 2 that will be described further on, the heating body 1 is supplied with steam (or other vapour) mingled with air or other non-condensing gas by a pipe 3; this pipe simultaneously serving to receive the condensate forming in the heating body and conveyed to the pipe 3 by the pipe 4 (Figs. 1, 2, 3, 4 and 6), which slopes downwardly towards the pipe 3 and member 2. The heating body 1 may be arranged horizontally, vertically or in inclined position, provided that the draining of the condensed vapour be allowed.

The pipe 4 may be dispensed with and replaced by an extension of the heating body, which extension may be arranged—if necessary—in the same horizontal plane as the heating body.

When steam is employed, for the normal working of the plant the air normally contained in the steam is generally sufficient.

The member 2 essentially comprises two adjacent chambers 5 and 6; the bottom of chamber 5 is connected to pipe 3. The bottom of chamber 5 is likewise connected to chamber 6 through a short duct 7, which opens into chamber 6 somewhat above the bottom thereof so as to form a hydraulic seal. At the top, the chamber 5 is connected to the heating body 1 so as to supply it with steam through the duct 8; at the same time the top of chamber 5 is connected to chamber 6 through a calibrated hole 9.

Into the chamber 6, a certain distance above its bottom, opens out the pipe 4, while the top end of said chamber is pierced with a calibrated hole 10 usually smaller than the hole 9. A slidable needle valve 11 serves to adjust the effective passage area of hole 10 at will; the fluid passing through hole 10 may be discharged through a duct 12 into a pipe which may be connected to the atmosphere or maintained at a determined pressure in any manner preferred.

The member 2 may be arranged at the opposite end of the heating body 1 by suitably lengthening the duct 8 and shortening the pipe 4 (Fig. 6). If required, it would also be practicable to do away with the pipe 4 and to separate the chambers 5 and 6, letting for instance the chamber 5 remain at the left hand end and shifting the chamber 6 to the opposite end; of course it would then be necessary to add two pipes, one for conveying the steam from 9 to the chamber 6 and the other for conveying the condensed water from the chamber 6 to the chamber 5.

The working of the plant described is as follows:

Assuming that the hole 10 be open and that in the pipe 12 a counterpressure $p$ lower than the pressure $P$ obtaining in the pipe 3 be maintained, the steam passes from pipe 3 into chamber 5 and from here into heating body 1; the condensate forming in the heating body flows into the chamber 6 through the hole 13, and traversing the hydraulic seal passes into the pipe 3.

At the same time a portion of the steam passes through hole 9 into chamber 6 and thence, through the calibrated hole 10, into the pipe 12. The consequence will be a pressure difference between chamber 5 and chamber 6, said difference being measured by the height $h$ of the water column forming the hydraulic seal in the connection existing at the bottom between the two chambers.

The said pressure difference obliges the steam to traverse the heating body and to overcome the resistances it encounters on its path.

The gas mingled with the steam and separating therefrom on the steam being condensed, is entrained to the bottom of the body 1 and is delivered, along with the condensate, into the chamber 6 from whence it passes through the hole 10 into the pipe 12.

According as the ratio between the pressure difference $h$ and the aggregate resistance R of duct 8 and heating body 1 varies, the steam will occupy a greater or smaller portion of the body 1 (the remaining portion being occupied by the gas) and the heating effect produced by the heating body 1 will decrease according as the steam retires to the left.

This variation of the ratio between the suction (pressure) $h$ and the aggregate resistance R of duct 8 and heating body 1 may be brought about in different manners:

(a) While maintaining the resistance R and the steam pressure P, one may decrease the heating effect of the heating body 1 if one decreases the effective passage area of the hole 10 by means of the needle valve 11, or increases the area of hole 9 as indicated in Fig. 3, or increases the counter-pressure *p*.

(b) While maintaining all the remainder unaltered, one may simply vary the pressure P of the steam. If this pressure is decreased, the heating effect is decreased because the steam temperature is lowered and above all because, owing to the diminished efflux through 10, the suction *h* is decreased.

(c) While maintaining P—*p*—*h* unaltered, one may increase the resistance R by means of a throttling device 14 variable at will provided on duct 8, as shown on Fig. 4.

The various provisions mentoned under (a), (b), (c), may be applied either singly, or all three of them at a time, or any two of them at a time.

Each of the variations indicated above may be carried out with means already known, either manually operated or automatic. Also by varying the amount of gas mingled wth the steam, the heating effect can be varied and even annulled or nearly annulled if the air is prevalent over the steam in the mixture.

If, in the assumption that the condensed water is drained on the counter-current system relatively to the steam, it be desired to separate the functions of the chamber 6 consisting in discharging through the siphon 7 the condensate arriving from the pipe 4 and in causing the suction of steam set up by the calibrated holes 10 and 9 to act across the pipe 4, the arrangement illustrated in Fig. 5 might be employed.

In this arrangement the condensate is drained through the chamber 6' which precedes the heating body. The chamber 6' supplies the steam to the body 1 and is itself supplied with steam from pipe 3 through the chamber 5 and the calibrated hole 8' (replacing the duct 8 of Figs. 1 and 2). The flow of steam through the aperture 8' is caused by pipe 4' and suction chamber 6'', due to the action already explained above in connection with the calibrated holes 9 and 10.

Referring now to the arrangement illustrated in Fig. 6, it differs from that of Figs. 1, 2, 3 by the fact that the two chambers 5 and 6 are extended upwardly by means of two pipes 15 and 16.

In this manner the apertures 9 and 10 are shifted away from the outlet of the pipe 4 which leads the condensate into the chamber 6. The modification is not a mere formal one, but improves the working of the plant inasmuch as it renders it more difficult for the steam entering through the aperture 9 to come into contact with the condensate delivered by the outlet 13 of pipe 4.

If such a contact takes place, the condensate will be more or less heated at the expense of the steam entering through 9 and the suction effect of the system will increase in a measure that may be undesirable for the end in view.

Should it be desired to obviate that the condensate discharges in counter-current with the steam, in the same manner as in the arrangement shown in Fig. 5, the arrangement illustrated by Fig. 7 may be adopted, in which a pipe 4'' exclusively serves for the discharge of the condensed water into the chamber 6'.

Having now particularly described and ascertained the nature of my said invention and in what manner the same is to be performed, I declare that what I claim is:—

1. Steam heating plant with manually adjustable heating effect, characterized by a heating body of any desired shape and arranged in any desired manner, plunged into any desired mass to be heated, and fed with steam mixed with a small amount of a non-condensing gas through a member which receives the condensate and restores it to the steam supply pipe the said member comprising two chambers which, below, are interconnected by an opening fitted with an hydraulic seal, and at the top are connected with each other and with the atmosphere through calibrated apertures, so that by varying, either by hand or automatically, the dimensions of the said apertures or the steam pressure steam amounts variable at will may be sucked through the heating body, and the heating effect may thus be varied.

2. Steam heating plant comprising a regulating device as claimed in claim 1, in which the upper portions of the chambers are connected by means of relatively long pipes to extension chambers containing the restricted ports establishing communication between the chambers and the atmosphere, for the purpose specified.

3. Steam heating plant comprising a regulating device as claimed in claim 1, in which the chamber communicating with the outlet end of the radiator or heating body is replaced by two chambers, one of which is arranged to receive water of condensation from the radiator, the other chamber being independently connected to the outlet end of the radiator and communicating with the restricted ports leading to the atmosphere and in the chamber to which steam is supplied, for the purpose specified.

GIACOMO ARTURO CASTELLAZZI.